W. T. BONNER.
BRAKE AND BRAKE LINER.
APPLICATION FILED JUNE 22, 1909. RENEWED OCT. 28, 1914.
1,141,606.  Patented June 1, 1915.
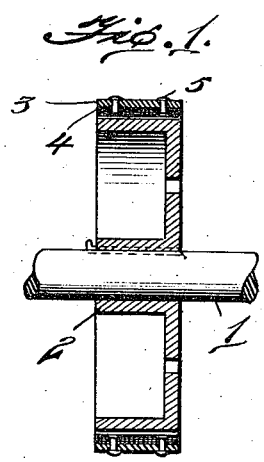
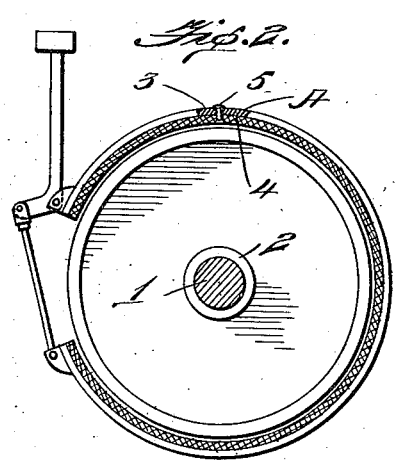
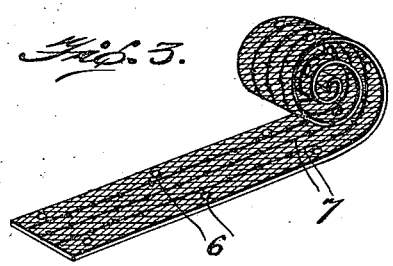
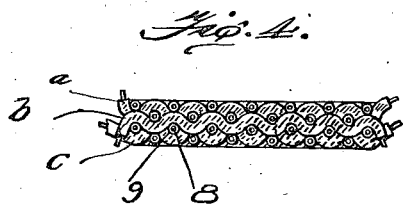
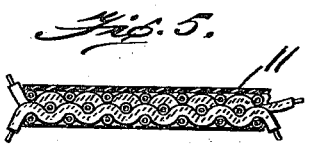
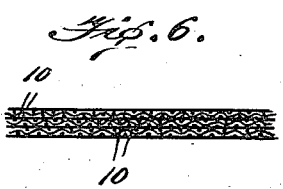
Witnesses
[signature]
M. V. Lowe.
Inventor
William T. Bonner
By K. P. McElroy.
Attorney

UNITED STATES PATENT OFFICE.

WILLIAM T. BONNER, OF TRENTON, NEW JERSEY, ASSIGNOR, BY MESNE ASSIGNMENTS, TO THE ASBESTOS BRAKE COMPANY, OF TRENTON, NEW JERSEY, A CORPORATION OF NEW JERSEY.

BRAKE AND BRAKE-LINER.

1,141,606.  Specification of Letters Patent.  Patented June 1, 1915.

Application filed June 22, 1909, Serial No. 503,625. Renewed October 28, 1914. Serial No. 869,146.

*To all whom it may concern:*

Be it known that I, WILLIAM T. BONNER, a citizen of the United States, residing at 62 South Hermitage avenue, Trenton, in the county of Mercer and State of New Jersey, have invented certain new and useful Improvements in Brakes and Brake-Liners, of which the following is a specification.

This invention relates to brakes and brake liners; and it comprises a braking element having a liner comprising an asbestos fabric containing interiorly incorporated cementing linoxin, said fabric preferably being further reinforced by contained metal; and it further comprises said liner, all as more fully hereinafter set forth and as claimed.

For automobile brakes and other high-duty braking purposes requiring flexibility of engagement of the braking means with the possibility of a fully graduated series of engagements between locking-engagement and no-engagement, asbestos is an efficient body-giving element since it combines good frictional powers for this purpose with a number of other desirable properties. Being little conductive of heat, heat developed on the braking face is not propagated elsewhere to any substantial extent, while such a development of heat does it no damage because of its heat-resisting powers. And in the form of asbestos fabric, it displays a type of resilience desirable in securing graduated engagements of the braking means. Unfortunately however the tensile strength of asbestos fabric is but low, asbestos threads, as threads, being comparatively weak with comparatively little tendency to lock or felt together, though the ultimate asbestos fibers themselves have considerable strength. For a brake liner it is therefore practically impossible to employ an asbestos fabric alone, some form of reinforcement or strengthening being necessary. For instance, the asbestos fibers or threads may be spun or knit around metal wires or filaments and these so-coated wires woven into fabric form. Such a compound fabric however while possessing considerable tensile strength does not well resist friction, there being a tendency for the asbestos fibers to break away locally where exposed to wear. There is, of course, in such a fabric no great amount of adhesion or engagement between the asbestos fibers or of the fibers with the core wire. It is therefore desirable that a further strengthening be given by uniting the fibers with each other and with the wire. While the former effect may be produced to a limited extent by "frictioning" the compound fabric, that is, coating it with a fluent rubber composition, in practice this does not work as well as can be desired. Rubber compositions are not particularly fluent when of strengths suitable for this purpose and they do not penetrate the fabric far even where fairly fluid compositions are used, without special means being adopted to that end; and that is commercially not very practicable in any event because of the great cost of rubber. Practically the effect of "frictioning" is confined to the surface and while this superficial effect is desirable as cementing together the fibers where exposed to wear, the full efficiency of the reinforcement by the metal is not thereby secured, nor is full advantage taken of the strength of the remaining asbestos fibers. Unless the cementing body thoroughly penetrates the fabric, there is no more than a frictional engagement between the wires and the asbestos of the body of the fabric.

By using a permeating cementing body, such as a drying oil, especially where certain expedients hereinafter set forth are resorted to, a much more desirable type of liner is obtained. While the tensile strength of the linoxin formed by the "drying" of drying oils, such as linseed oil, poppy oil, sunflower oil, etc., is not great when existing as a body yet in the form of thin films, layers or columns it has considerable strength; and the same is true of the similar substances formed by the setting of wood or tung oil and like drying oils. On the other hand, as stated, while asbestos threads are not very strong, yet the ultimate fibers are possessed of considerable strength. Therefore by producing a close fabric of asbestos having the several fibers close together and the interspaces filled with films of dried oil in cohering union with said fibers, full advantage is taken of the strength of both and the compound fabric has a strength greater than the sum of the strengths of the two components. The individual asbestos fibers, which, as stated, have considerable strength are no longer free to slide over each other but are locked in position by relatively strong, cohering films of the dried oil. An oil-impregnated asbestos fabric or cloth under the present invention even without reinforcing wire has a relatively great mechanical strength; sufficient to adapt it for many braking purposes. However it is better to use the wire reinforcement also. With such a reinforcement, the cementing oil produces a direct positive locking of the asbestos fibers to the wire as well as to each other and a full utilization of the strength of such wire is secured, stresses and strains being directly transmitted thereto from the braking surface.

The oil-impregnated asbestos fabric may be utilized as a braking element by securing it to any suitable holding member adapted to engage it and to support the flat face thereof opposite the surface used for braking. In such use the exposed face acts as a brake while the cementing oil transmits strains on the face to and through the body. Any local overheating merely burns out locally a little of the cementing oil and does no harm. With the wire-reinforced fabric, an even better type of resilience is obtained than with the oil-impregnated asbestos fabric alone.

Either the true asbestos or the Canadian chrysotile may be employed. "Mineral wool" is less suitable.

In order to produce the desired type of union between fibers and cementing oil, the impregnated fabric is best submitted to heavy pressure, as by a hydraulic press, prior to final drying. This squeezes out the excess of oil and brings the fibers and wire into close approximation so as to reduce to a minimum the thickness of the intervening and uniting thin oil layers, thereby concomitantly raising the mechanical strength of such thin layers.

In practice, it is better to use a plurality of layers of the treated asbestos fabric as plies of a laminated fabric, thereby attaining a better distribution of strains back to the holding member and a better resilience of the liner as a whole. As stated, this resilience is important in securing a graduated series of engagements.

In making a liner fabric under the invention, suitable wire may be covered with asbestos fibers by spinning or otherwise and these coated wires then woven or knit into fabric form. Oil impregnation is best postponed till after making the fabric, it being less convenient to impregnate the covered wire prior to weaving or knitting. A cheap and simple way of operating however is to paint or varnish the wire prior to weaving with a paint of comminuted or flock asbestos and an oil vehicle. The fabric so produced is however not as good as where ordinary fibers are employed in the way described.

With unimpregnated fabric produced as described, such fabric is next dipped or plunged in suitable drying oil and removed after complete impregnation. Ordinary boiled oil and Chinese wood oil are both eminently suitable for the present purposes. After allowing the excess oil to drip off or otherwise removing it, the impregnated fabric is next best pressed under heavy pressure to bring the fibers into close approximation and reduce the thickness of the oil films uniting them. This pressing may be done immediately after dipping or just before final drying.

In making a laminated liner consisting of a plurality of plies of treated asbestos fabric, the fabric may be passed continuously through a suitable bath of boiled or raw linseed oil or linseed oil mixture, the excess of oil being expressed out or wiped off. It may then be allowed to dry nearly to completion, as being hung up to dry. As many plies as may be desired may then be assembled, either by using separate pieces or by folding a single piece. These plies may be stitched together in any ordinary way, and preferably with rather close stitching, with either thread or wire. The assembled plies are then placed in a press, preferably a hydraulic press, submitted to heavy pressure and allowed to dry to completion. After the compression and the final drying, the cementing oil throughout the body of the liner is converted into an integral mass.

The complete liner, whether laminated or single ply, may finally, be given a facing coat of rubber on the braking face.

The liner is assembled with any suitable holding element by bolting, riveting, or the like, to form a brake.

In the accompanying illustration I have shown, more or less diagrammatically, certain embodiments of the described invention.

In this showing: Figure 1 is a vertical transverse section of a brake spool and brake provided with the oil-impregnated asbestos liner; Fig. 2 is an elevation partly broken away at right angles to the view of Fig. 1; Fig. 3 is a view in perspective of a portion of a coil of laminated liner ready for application; Fig. 4 is a section on an enlarged scale of such liner; Fig. 5 is a similar view showing the liner carrying a "frictioning" of rubber; and Fig. 6 shows a liner with intercalated rubber layers.

In Figs. 1 and 2, shaft 1 of some element to be braked, as an automobile, carries a hub or spool 2 having a rim or periphery adapted for braking. With this engages strap brake 3 provided with a brake liner 4 of impregnated asbestos, secured thereto in any suitable way, as by bolts or rivets 5. Fig. 3 shows a coil or roll of this liner ready for assemblage with the holding element (3). Perforations 6 are for rivets or bolts. Stitches 7 are of thread or wire. In Fig. 4 a 3-ply fabric is shown, the plies being lettered *a, b* and *c*. Element 8 in each ply is a wire covered with coating 9 of asbestos and woven into fabric with similar covered wire. The plies are saturated, as stated, with linseed or other drying oil.

In Fig. 5, the liner of Fig. 3 is shown provided with a "frictioning" of rubber, applied either as a fluid composition or as a more or less fluent solid rubber composition applied under pressure and heat. If so desired, the rubber can occur between the plies, but this is not ordinarily desirable. Where it is so desired however, either both sides of the several plies may be coated prior to assembling, or one side of a sheet of fabric may be so coated and the sheet folded to form the desired number of plies. This will of course bring a layer of rubber between each pair of plies. In so applying rubber it is found that the rubber clings much more evenly and perfectly to the oil-cemented asbestos than it will to asbestos alone. In Fig. 6, such a compound fabric is shown, there being intercalated layers 10 of rubber or rubber composition between each pair of plies of oil-cemented asbestos.

For brake purposes, it is very desirable that the liner be comparatively insensitive to heat and this property is given it by the asbestos body. The several strands of wire being spaced apart by the asbestos coating are not in contact and can not propagate heat from the one to the other. The linseed oil is also fairly heat-insensitive. When oxidized or "dried" it is no longer fusible, and it withstands a temperature up to 700° F., being indeed frequently "blown" at temperatures reaching 680°. Rubber on the other hand rarely is able to withstand as much as 400° F. and it softens and fuses much below this temperature in the case of many compositions.

The drying oil used may be thinned with various compositions ordinarily used in paint and varnish, but this is not necessary in the present case. Asbestos has a "drying" effect on linseed oil and even raw oil when applied to the fabric as stated, dries in the course of a very few hours.

What I claim is:—

1. In a braking element, a plurality of plies of wire-reinforced asbestos fabric, said plies being impregnated with drying oil and the outer ply being faced with a rubber composition.

2. A brake provided with a liner comprising a plurality of united plies of wire-reinforced asbestos fabric impregnated with drying oil, said liner carrying a facing layer of rubber composition.

3. In a braking element a plurality of assembled plies comprising one or more plies of oil-impregnated reinforced asbestos and one or more plies of rubber.

4. In a brake, the combination of a holding element and a liner comprising one or more plies of oil-impregnated reinforced asbestos and one or more plies of rubber.

5. A band brake comprising a holding element and a brake band therefor comprising assembled plies of woven, metal-reinforced asbestos containing an oil impregnation, intercalated layers of rubber composition between such plies and a facing of rubber composition, said plies being stitched together.

In testimony whereof, I affix my signature in the presence of witnesses.

WILLIAM T. BONNER.

Witnesses:
 JOHN W. SIGGERS,
 K. P. MCELROY.